United States Patent
Ayyagari et al.

(10) Patent No.: US 12,335,693 B2
(45) Date of Patent: Jun. 17, 2025

(54) COMPUTER TECHNOLOGY FOR PREDICTION OF HEARING ISSUES

(71) Applicant: International Business Machines Corporation, Armonk, NY (US)

(72) Inventors: Phani Kumar V. U. Ayyagari, Hyderabad (IN); Manish Anand Bhide, Hyderabad (IN); Purnachandra Rao Jasti, Hyderabad (IN); Madan K Chukka, Hyderabad (IN); Sai Prasanth Vuppala, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 17/647,478

(22) Filed: Jan. 10, 2022

(65) Prior Publication Data
US 2023/0224652 A1 Jul. 13, 2023

(51) Int. Cl.
*H04R 29/00* (2006.01)
*G06F 1/16* (2006.01)
*G06F 9/451* (2018.01)

(52) U.S. Cl.
CPC .......... *H04R 29/00* (2013.01); *G06F 1/163* (2013.01); *G06F 9/453* (2018.02)

(58) Field of Classification Search
CPC .......... H04R 29/00; G06F 9/453; G06F 1/163
See application file for complete search history.

(56) References Cited

U.S. PATENT DOCUMENTS

| | | | |
|---|---|---|---|
| 9,716,955 B1 * | 7/2017 | Rauschmayer | G08B 21/182 |
| 9,774,942 B1 * | 9/2017 | Rauschmayer | H04R 1/1041 |
| 9,918,173 B1 * | 3/2018 | Rauschmayer | H04R 5/04 |
| 2008/0130906 A1 * | 6/2008 | Goldstein | A61B 5/121 381/58 |
| 2013/0343585 A1 * | 12/2013 | Bennett | H04W 4/80 381/317 |
| 2017/0150282 A1 | 5/2017 | Mishra | |
| 2017/0295435 A1 * | 10/2017 | Gajstut | H04R 25/505 |
| 2018/0089976 A1 * | 3/2018 | Yarlagadda | G16H 40/67 |
| 2020/0152328 A1 * | 5/2020 | Bender | G06N 20/00 |
| 2020/0155058 A1 * | 5/2020 | Rakshit | A61B 5/0011 |
| 2022/0272465 A1 * | 8/2022 | Boldt | A61B 5/165 |
| 2022/0295192 A1 * | 9/2022 | Boldt | H04R 25/558 |
| 2023/0136321 A1 * | 5/2023 | Eirinberg | H04L 51/10 348/211.99 |

FOREIGN PATENT DOCUMENTS

EP 3841967 A1 6/2021

OTHER PUBLICATIONS

Disclosed Anonymously, "Method and System for Detecting Hearing Degradation", an IP.com Prior Art Database Technical Disclosure, IP.com No. IPCOM000255614D, Oct. 3, 2018, 3 pgs.

Disclosed Anonymously, "System and Method to Calculate Potential Risk of Hearing Loss Using Telephony Devices", an IP.com Prior Art Database Technical Disclosure, IP.com No. IPCOM000237503D, Jun. 19, 2014, 3 pgs.

* cited by examiner

*Primary Examiner* — Simon King
(74) *Attorney, Agent, or Firm* — Kesley Skodje

(57) ABSTRACT

Computer technology for determining a possibility of an emerging hearing issue in a user based on the user's auditory interactions with a mobile device (for example, a smartphone), a wearable computer device (for example, a smart watch) and/or a virtual assistant (for example, an internet of things (IoT) enabled doorbell).

20 Claims, 2 Drawing Sheets

COMPUTER TECHNOLOGY FOR PREDICTION OF HEARING ISSUES

BACKGROUND

The present invention relates generally to the field of detection of hearing issues by computer technology.

It is known that a person may not realize that they have a hearing issue until the issue fully matures into a hearing problem that can affect quality of life. Studies reveal that anything that is caught in early stage has a higher probability of getting cured when recognized and treated earlier in the progression of the incipient hearing issue. Hearing issues tend to worsen over time if attention to the issue does not occur at an early stage.

SUMMARY

According to an aspect of the present invention, there is a method, computer program product and/or system for use by a user who interacts in an auditory manner with a mobile device that performs the following operations (not necessarily in the following order): (i) receiving a mobile device auditory usage data set including information indicative of the user's auditory interactions with the mobile device; (ii) performing analytics on the mobile device auditory usage data to determine indication(s) of an emerging hearing issue; and (iii) communicating a message indicating a possibility of an emerging hearing issue based, at least in part, on the determination of indication(s) derived from the mobile device auditory usage data set.

According to an aspect of the present invention, there is a method, computer program product and/or system for use by a user who interacts in an auditory manner with a wearable computer device that performs the following operations (not necessarily in the following order): (i) receiving a wearable device auditory usage data set including information indicative of the user's auditory interactions with the wearable computer device; (ii) performing analytics on the wearable device auditory usage data to determine indication(s) of an emerging hearing issue; and (iii) communicating a message indicating a possibility of an emerging hearing issue based, at least in part, on the determination of indication(s) derived from the wearable device auditory usage data set.

According to an aspect of the present invention, there is a method, computer program product and/or system for use by a user who interacts in an auditory manner with a virtual assistant (VA) device that performs the following operations (not necessarily in the following order): (i) receiving a VA auditory usage data set including information indicative of the user's auditory interactions with the VA device; (ii) performing analytics on the VA device auditory usage data to determine indication(s) of an emerging hearing issue; and (iii) communicating a message indicating a possibility of an emerging hearing issue based, at least in part, on the determination of indication(s) derived from the VA auditory usage data set.

DETAILED DESCRIPTION

Figure 1:
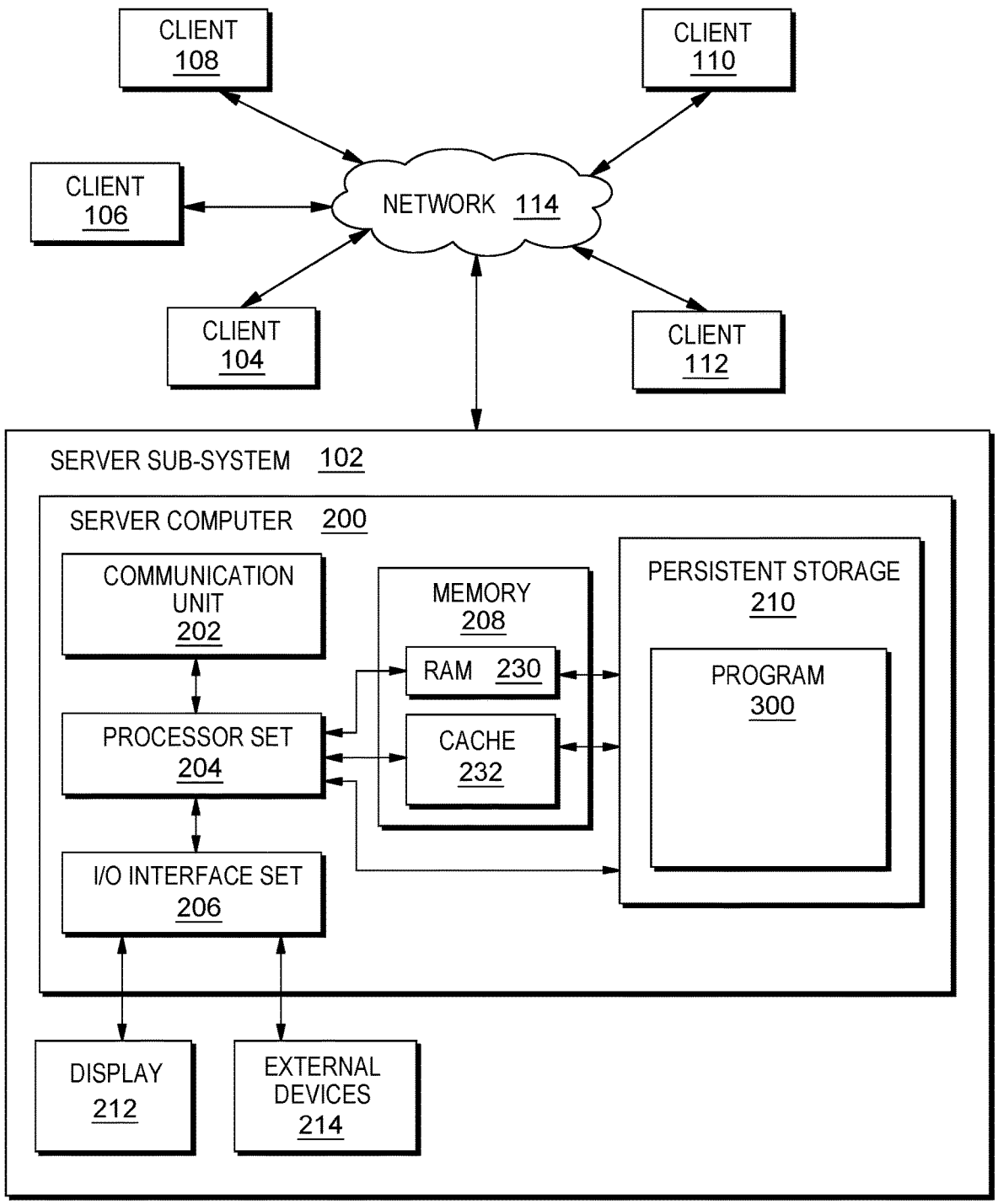
FIG. 1 is a block diagram of a first embodiment of a system according to the present invention.

Some embodiments of the present invention are directed to [quote abstract here].

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
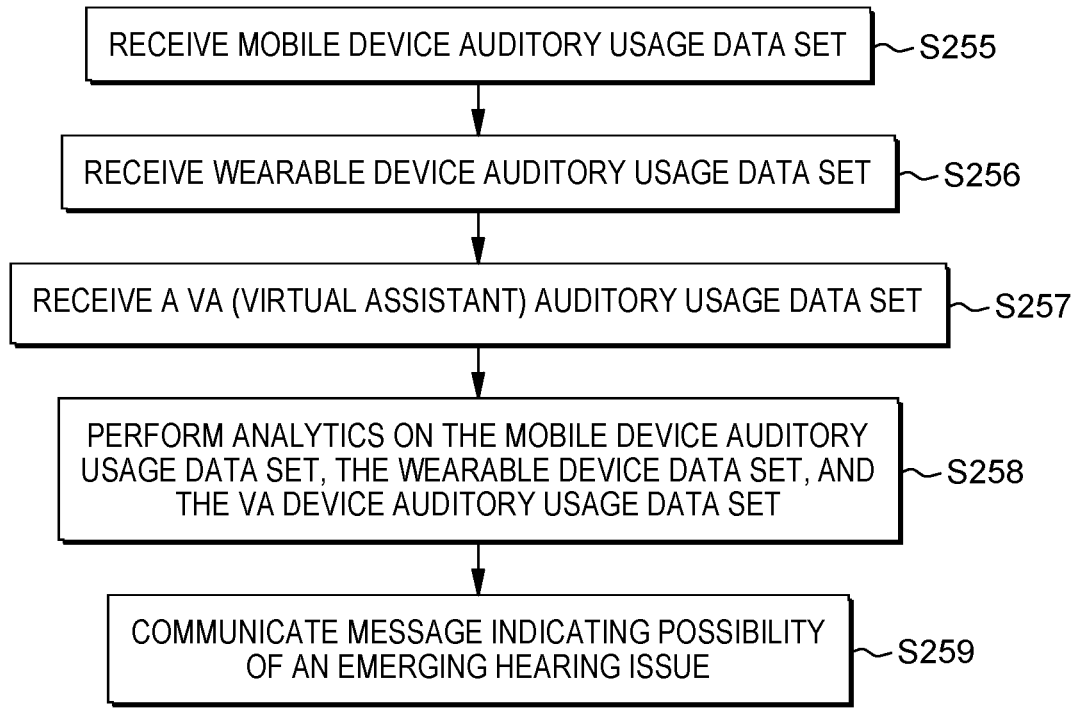
FIG. 2 is a flowchart showing a first embodiment method performed, at least in part, by the first embodiment system.
Figure 3:
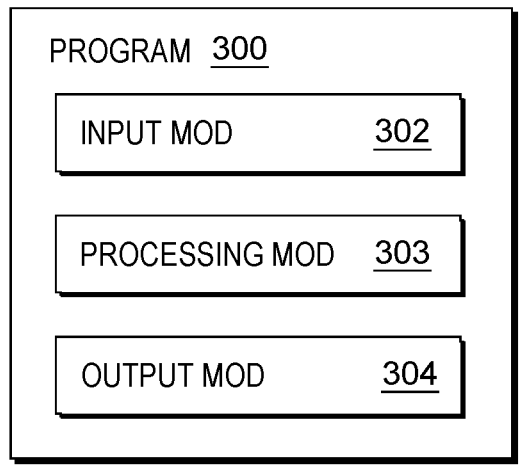
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where input module ("mod") 302 receives a mobile device auditory usage data set including information indicative of a user's auditory interactions with their mobile device. These auditory interactions include any interactions between the user and their mobile device that involve the user's sense of hearing. Examples include phone calls, listening to movies, television shows, podcasts and audiobooks. In this example, the mobile device and user are part of client subsystem 104. The mobile device auditory usage data set is collected by the operating system of the mobile device. The information collected includes information such as distance between a user's head and the mobile device when audio is being presented, requests by the user to repeat information, the user rewinding audio presentations like audiobooks, volume settings when audio is playing and changes in volume made by the user when audio is playing.

Processing proceeds to operation S256, where input mod 302 receives a wearable device auditory usage data set including information indicative of the user's auditory interactions with the wearable computer device. These auditory interactions include any interactions between the user and their wearable device (in this example, a smart watch, also included in client subsystem 104) that involve the user's sense of hearing. Examples include phone calls and listening to audio cues from a step counter built into the smart watch. The wearable device auditory usage data set is collected by the operating system of the wearable device. The information collected includes information such as distance between a user's head and the wearable device when audio is being presented, requests by the user to repeat information, the user rewinding audio presentations, volume settings when audio is playing, changes in volume made by the user when audio is playing and the user's reactions made to ambient warning sounds (for example, vehicle horns in the user's environs).

Processing proceeds to operation S257, where input mod 302 receiving a VA (virtual assistant) auditory usage data set including information indicative of the user's auditory interactions with a VA device. These auditory interactions include any interactions between the user and their VA device that involve the user's sense of hearing. In this example, the VA device is in the form of an IoT (internet of things) enable doorbell that interacts with a home console located at a central location in the house and is also included in client subsystem 104. Examples of VA audio interactions include doorbell alert sounds played through the home console when the doorbell is rung. The VA auditory usage data set is collected by the operating system of the VA device. The information collected includes information such as distance between a user's head and the home console when a doorbell alert sound is played, the user's response (or non-response) to the doorbell alert sounds and the volume setting of the home console.

Processing proceeds to operation S258, where processing mod 303 performs analytics on the mobile device auditory usage data, the VA device auditory usage data set and the wearable device to determine indication(s) of an emerging hearing issue. These indications will be further discussed in the next sub-section of this Detailed Description section.

Processing proceeds to operation S259, where output mod 304 communicates a message indicating a possibility of an emerging hearing issue based, at least in part, on the determination of indication(s) derived from the auditory usage data sets. With the user's permission, in this example, the communication is in the form of emails to the user and the user's physician.

III. Further Comments and/or Embodiments

Some embodiments of the present invention may include one, or more, of the following operations, features, characteristics and/or advantages: (i) a solution where the hearing behavior of the user is monitored and any change in the behavior is alerted to the user so that he can take some action; (ii) various parameter values, corresponding to various parameters, for a given user are monitored through personal devices to identify the aspects of change in hearing; (iii) the user will be alerted ahead so that the worst case implications are thwarted; and/or (iv) people approaching old age can take advantage of this to avoid hearing aids or loss of hearing.

Some embodiments of the present invention may include one, or more, of the following operations, features, characteristics and/or advantages: (i) the user can use multiple devices like mobile, laptop, home assistant, wearable devices and the like at home; (ii) the hearing behavior at each device is monitored and sent to a server through a communication network; (iii) all the abnormal observations related to hearing collected at each device are communicated to the server; (iv) analytics is run on these data to arrive at a probability about the impending hearing issue; (v) this can be a general framework which all operating systems of all devices can implement; (vi) this can be called health mode and inside health mode there will be further modes for monitoring anomalies related to hearing; (vii) if the mode is enabled, the monitoring will kick start for any hearing anomaly that has been determined to be probable; and/or (viii) this can also be enabled by an application which is installed on every device.

Some embodiments of the present invention may include one, or more, of the following operations, features, characteristics and/or advantages: (i) one indication for a mobile device is that, over a period of time, the user increases the volume and keeps setting volume to a maximum level (this behavior is constantly monitored during calls, while listening music, etc.); (ii) another indication for a mobile device is frequent behavior of a user not picking up his phone calls, though the phone is in loud mode, and then later calling back by seeing missed calls; and/or (iii) another indication that may be gleaned from a mobile device usage pattern occurs when the user is asks the other person to repeat a few things in most of the phone calls.

Some embodiments of the present invention may include one, or more, of the following operations, features, characteristics and/or advantages: (i) an indication that may be gleaned form a usage pattern of a wearable device occurs when the user is not sleeping and is not checking notifications on a wearable device like a watch; (ii) another indication that can be gleaned from a usage pattern of a wearable device occurs relates to the distance that the user keeps a watch or a wearable device while taking phone calls from the device; and/or (iii) another indication that can be gleaned from a usage pattern of a wearable device occurs when, while roaming outside, wearable devices like watches determine how quickly the user is reacting to vehicle sounds or vehicle horns.

Some embodiments of the present invention may include one, or more, of the following operations, features, characteristics and/or advantages: (i) an indication that may be gleaned from a usage pattern of an assistant device occurs when a user is asking a home assistant to repeat an answer and asking the same question repeatedly; (ii) an indication that may be gleaned from a usage pattern of an internet of things (IOT) enabled device occurs when a user did not open a door despite multiple IoT doorbell rings; (iii) another indication that may be gleaned from a usage pattern of an internet of things (IOT) enabled device occurs when a user increases volume of an IoT television or stands close to the IoT television to listen to the sound; and/or (iv) with the advancements in IoT televisions, the system can observe viewers and their volume level and this can be used to determine if the person is watching TV with more volume than usual.

Some of the foregoing indications mentioned in the previous paragraphs can be normal and therefore not indicative of an emerging hearing issue. Hence, some embodiments do not depend on a single device to draw a broader conclusion that an anomaly is indicated. Instead, these embodiments curate data from multiple devices and then run analytics to determine whether there is a sufficient probability of an emerging hearing issue.

Though all these prior arts talk about alerting the user over a sensory abnormality that may arise in the future, embodiments of the present invention mainly focuses on a system that implements a health mode which is part of an operating system.

Some embodiments include a health mode which is exposed to user applications by the operating system running on a device. This mode is exported by the operating system running on all the devices. In health modes, there are sub modes (related to an abnormality of hearing or walking or sitting, etc.) which can be selectively enabled by a user. When one of the sub-modes is selected, it will be enabled on all the connected devices. For example, if two modes are enabled, a device which is participating in the monitoring activity will monitor parameters required for both the modes. In some embodiments, the implementation for each mode on a device is vendor specific. In some embodiments, machine logic selectively detects any abnormality based on the user's choice. If this mode is enabled the monitoring will kick start for respective anomalies on all the user devices. For example, an operating system of a mobile device can provide this as a feature which a user can enable so that he can prevent any future abnormality.

In some embodiments, on each device, multiple applications can use the API (application programming interface) exported by OS (operating system) to send the data for analysis. Any application can exploit this functionality and participate in contributing to data. For example, if a given virtual assistant implements detection of hearing abnormalities, then it will collect the data of how many times a user is asking the virtual assistant to repeat an answer and is asking a similar question repeatedly.

Some embodiments co-ordinate input received from capable and selective user devices with the health mode enabled which can monitor parameters related to a hearing abnormality. In some embodiments, only abnormal parameters from each device are communicated to the server and the user is alerted only when an abnormal behavior is observed on more than one device. Also, a user or the owner of the device can have a control to disable/enable this mode to remove/add a device for monitoring.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer-implemented method (CIM) for use by a user who interacts in an auditory manner with a mobile device, the CIM comprising:
receiving a mobile device auditory usage data set including information indicative of the user's auditory interactions with the mobile device;
performing analytics on the mobile device auditory usage data set to determine indication(s) of an emerging hearing issue; and
communicating a message indicating a possibility of an emerging hearing issue based, at least in part, on the determination of indication(s) derived from the mobile device auditory usage data set, wherein the indication(s) comprise at least one indication based on frequent user behavior of failing to pick up phone calls and then later calling back after seeing visual indications of phone calls.

2. The CIM of claim 1 wherein the indication(s) derived from the mobile device auditory usage data set include at least one indication based on the user increasing volume to a maximum level and maintaining mobile device volume at the maximum level.

3. The CIM of claim 1 wherein the failing to pick up phone calls is limited to phone calls received when the mobile device is in a loud mode.

4. The CIM of claim 1 wherein the indication(s) derived from the mobile device auditory usage data set include at least one indication based on the user asking for repetitions of auditory information that has been presented during phone calls.

5. The CIM of claim 1, further comprising receiving a wearable device auditory usage data set including information indicative of the user's auditory interactions with the wearable device.

6. The CIM of claim 1, further comprising receiving a VA auditory usage data set including information indicative of the user's auditory interactions with a VA device.

7. A computer-implemented method (CIM) for use by a user who interacts in an auditory manner with a wearable computer device, the CIM comprising:
    receiving a wearable device auditory usage data set including information indicative of the user's auditory interactions with the wearable computer device;
    performing analytics on the wearable device auditory usage data set to determine indication(s) of an emerging hearing issue; and
    communicating a message indicating a possibility of an emerging hearing issue based, at least in part, on the determination of indication(s) derived from the wearable device auditory usage data set, wherein the indication(s) derived from the wearable device auditory usage data set include at least one indication based on speed of user reactions to ambient warning sounds.

8. The CIM of claim 7 wherein the indication(s) derived from the wearable device auditory usage data set include at least one indication based on instances of a situation where the user is not sleeping and is not checking notifications on the wearable computer device.

9. The CIM of claim 7 wherein the indication(s) derived from the wearable device auditory usage data set include at least one indication based on a distance that of the wearable device from the user's ears when taking phone calls through the wearable computer device.

10. The CIM of claim 7 wherein the wearable computer device is in the form of a watch.

11. The CIM of claim 7 wherein the ambient warning sounds include sounding of vehicle horns.

12. The CIM of claim 7 further comprising:
    receiving a mobile device auditory usage data set including information indicative of the user's auditory interactions with a mobile device,
    wherein the performance of analytics to determine indication(s) of an emerging hearing issue includes performing analytics on the mobile device auditory usage data.

13. The CIM of claim 12 wherein the wearable computer device is in the form of a watch.

14. The CIM of claim 7, further comprising receiving a VA auditory usage data set including information indicative of the user's auditory interactions with a VA device.

15. A computer-implemented method (CIM) for use by a user who interacts in an auditory manner with a virtual assistant (VA) device, the CIM comprising:
    receiving a VA auditory usage data set including information indicative of the user's auditory interactions with the VA device;
    receiving a mobile device auditory usage data set including information indicative of the user's auditory interactions with a mobile device;
    receiving a wearable device auditory usage data set including information indicative of the user's auditory interactions with a wearable computer device;
    performing analytics on the VA device auditory usage data set, the mobile device auditory usage data set, and the wearable device auditory usage data set to determine indication(s) of an emerging hearing issue; and
    communicating a message indicating a possibility of an emerging hearing issue based, at least in part, on the determination of the indication(s).

16. The CIM of claim 15 wherein the indication(s) derived from the VA device auditory usage data set include at least one indication based on the user requesting the VA device to repeat audio information previously presented to the user.

17. The CIM of claim 15 wherein the VA device is in the form of an internet of things (IOT) enabled device.

18. The CIM of claim 15 wherein the VA device is in the form of an internet of things (IOT) enabled doorbell device.

19. The CIM of claim 15, wherein the mobile device auditory usage data set is collected by an operating system of the mobile device.

20. The CIM of claim 19, wherein the mobile device auditory usage data set comprises data from multiple applications.

* * * * *